Patented Jan. 30, 1934

1,945,347

UNITED STATES PATENT OFFICE 1,945,347

MARGARINE WITH IMPROVED FLAVOR AND PROCESS

Albert K. Epstein and Benjamin R. Harris, Chicago, Ill.

No Drawing. Application August 15, 1930
Serial No. 475,634

11 Claims. (Cl. 99—13)

Our invention relates in general to improved flavoring substances, and more particularly to margarine flavored with such substances.

In the manufacture of margarine the flavor is imparted thereto by the cultured milk with which the oleaginous materials are emulsified. The lactic acid organisms which are used in cultured milk produce end products of bacterial decomposition possessing flavoring properties. The types of organisms which have the most desirable flavoring properties are selected by plating out mixed cultures and then propagated in the laboratory to produce larger batches with which the milk is inoculated. It is found, however, that it is very difficult to propagate the type of organism which is responsible for the most pleasant aroma. Even after a satisfactory culture has been produced the organisms will be attenuated in a comparatively short length of time and the aroma is lost, with the result that substantially the only flavoring is that produced by the presence of a strong lactic acid.

The principal object of our present invention is to provide an improved means for imparting the most desirable aroma to margarine and similar products.

Another object is to produce a highly desirable margarine flavor under conditions which can be duplicated readily from one batch to another.

Another object is to provide flavoring substances for margarine capable of ready use by everyone in the trade.

Another object is the provision of improved butter flavoring in a condition which permits it to be vended to the trade.

We have discovered a certain group of chemical compounds which have very great utility in imparting a uniform flavor to margarine and other culinary preparations whether of an oleaginous type or otherwise. These substances are diketones, all having the same general structural formula, which will be described more in detail hereinafter. We have found that when these substances are added to margarine in the proportion of from two to five parts per million, based upon the weight of the margarine, they have the property of imparting thereto a very desirable flavor. It then becomes possible to produce margarine from milk cultured by inoculation of ordinary types of lactic organisms which produce very little of the butter like aroma so much desired. This aroma can then be obtained by the simple addition of suitable diketones, as will be set forth. Attention is directed to the fact that by this means we are able to obtain a very uniform product, which is now impossible with margarine, and substantially impossible even in the best grades of creamery butter.

The group of substances which we have employed with greatest satisfaction are diketones having the general structure

wherein "R" and "R'" represent ethyl, methyl, propyl, or similar groups, and in which the groups R and R' taken together contain at least two carbons but not more than six carbons, and wherein the carbonyl groups are adjacent to each other.

We have found that all of these substances possess certain flavoring value, but that they all differ slightly, both in flavor and other characteristics. In general, the low carbon compounds are more volatile than the higher carbon compounds of the group, and also apparently, those of higher carbon content can be used in smaller proportions. Most of these substances when prepared in concentrated form, do not possess a pleasant odor, but when sufficiently diluted possess a very pleasing aroma. Some possess a delicate cream like odor, others have a slight caramel odor, resembling the odor produced by certain types of lactic acid organisms of the citro-vorous group. Still other members of the group possess an odor in dilute solutions somewhat resembling fresh strawberries. We have found however, that various combinations of the group may be made which give a very pleasant and desirable aroma to margarine, renovated butter, and other types of substances used in the culinary arts.

More specifically now with respect to the chemical characteristics of the substances themselves, we have demonstrated that only those coming within the group described are desirable for our purpose. We have found that compounds having more than eight carbons in the molecule and in which the carbonyl groups are not adjacent to each other, are not suitable for the purpose of our invention. It appears from this and other data that the compound should not possess more than six carbon atoms in the R and R' groups taken together to secure the best results.

We have prepared these substances synthetically and use a predetermined quantity of various members of the group singly or in combination to impart flavor to oleaginous products such as margarine and other similar substances. Thus we have used among other substances of the group,

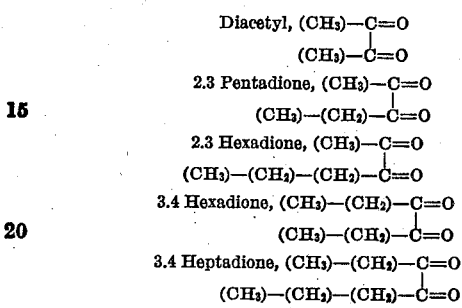

Any of these substances may be used individually, but we have found that we obtain the best results by combinations thereof. As an example, however, of some of the characteristics of these compounds, we found that five cubic centimeters of a 2% solution of 2.3 pentadione was sufficient to flavor one hundred pounds of margarine, while ten to twelve cubic centimeters of 2% solution of diacetyl was necessary to impart the desired aroma to one hundred pounds of margarine. In general, the higher members of the above described diketone group can be used in much smaller amounts than the lower members of the group.

As previously stated we found that certain combinations of various members of the group give the most desired bouquet. It appears that while one member of the group may have a more desirable butter flavor, another member of the group used in combination therewith will have the effect of intensifying or fixing the aroma of the first one of the group, and producing a desired blend. Among the combinations which we found very satisfactory was a combination of three parts of diacetyl with one-fourth part of 2.3 pentadione, or three parts of diacetyl with one-fourth part of 2.3 hexadione. These proportions are incorporated in a suitable solution to obtain the best results.

When the flavoring substances of our invention are produced synthetically, they are obtained in a relatively concentrated form, but in this condition possess a very penetrating and somewhat disagreeable odor. It is found that they must be present in quite dilute condition in order to obtain the most satisfactory results. If the solution is too concentrated these substances have the ability to penetrate other substances which may be near them, and so as far as commercial use or offering them to the trade is concerned, they would be unsatisfactory. The flavoring power of the substances is so exceedingly great that from two to five parts per million is ample to impart a strong butter like flavor to margarine. We accordingly produce the substances in the form of comparatively weak solutions and offer them to the trade in this way. The substances so prepared possess a yellow color with a slightly greenish cast.

Each one of the members of the group outlined above has slightly different solubility characteristics. In general however, the commonest of these substances are found to be approximately 4 to 6% soluble in water, possess considerably greater solubility in oleaginous substances, depending upon a number of conditions, and are soluble in almost all proportions in alcohol and similar solvents. The solution produced therefore, will depend to some extent upon the type of solvent employed. We have found that in vending our substances to the trade the solution should not be more than about a 10% solution to obtain the best results. There is really no minimum except that dictated by common sense, as even in a solution of $\frac{1}{10}$ of 1%, some flavoring power exists. For all practical purposes, we have found that a 2% solution of our substances in water is very satisfactory. This is particularly true since we have developed a process for the production of our substances which yields a 2% solution and enables us to produce the compound in a condition to be offered to the trade much more economically.

There are many ways of introducing the substances of our invention into margarine. In general, they can be introduced into the oleaginous material, through the cultured milk, or into the emulsion before it has been crystallized. Since the substances possess considerable volatile character, and are sufficiently water soluble to wash out during certain steps in the margarine manufacturing process, there is a possibility of some of the strength being lost during the production of the margarine. We have found that the most desirable method of introducing the substances into the margarine is by kneading the same thereinto during the blending operation after the margarine has been produced in solid form. This may be done in connection with the introduction of salt or at any time in the blending process.

In connection with the use of the diketones with margarine, attention is directed to the fact that the substances having higher carbon content, say above four carbons, are considerably more difficultly soluble in water than the lower carbons such as diacetyl. Not only are the higher substances somewhat more difficultly soluble than the lower substances in aqueous media, but it is found that when a combination is employed the higher substances have a tendency to improve and fix the flavor imparted by the lower substances. This means that not only is the product improved in flavor, but when the process is carried out with margarine, there is less tendency toward washing out the higher carbon compounds and combination thereof than the relatively lower carbon substances.

Instead of blending the flavoring mixture into the completed margarine directly, such substances may be dissolved in water, milk, or oleaginous material, and blended into the completed margarine with these substances as a carrier.

As previously set out, our invention looks to the production of solutions of the flavoring substances in satisfactory solvents. These may be aqueous solvents, oleaginous, spirit (alcohol), or the like. This includes the incorporation of the flavoring compounds with solid fatty products which may be substantially purely oleaginous in character or may be emulsions of oleaginous and aqueous substances.

In our copending application, Serial No. 475,633 filed August 15, 1930, we describe a pastry product constisting of a relatively large number of thin layers of flour batter separated by relatively high melting point oleaginous material containing moisture with some small amount of air which produces a puffiness of the product during baking. This oleaginous material is an emulsion of a relatively small amount of water with a high melting point fat such as oleostearine. We have found that our flavoring compounds may be introduced into this type of oleaginous material, being dissolved in either the oleaginous phase or aqueous phase of the product, or possibly in both. When the diketones are used in a substance of this kind, intended for baking at elevated temperatures, it is advisable to employ as large an amount of the higher carbon compounds as possible, consistant with the flavor demanded.

The term "margarine" as used in the claims is intended to include such emulsion products.

What we claim as new and desire to protect by Letters Patent of the United States is:

1. As a new article of manufacture, oleomargarine having included therein a relatively small proportion of a diketone having the general structure

wherein "R" and "R'" represent ethyl, methyl, propyl or similar groups, and in which the R and R' groups taken together contain not less than two carbon atoms, nor more than six, and in which the carbonyl groups are adjacent to each other.

2. As a new article of manufacture, oleomargarine having included therein a relatively small proportion of a mixture of diketones of the general structure

wherein "R" and "R'" represent ethyl, methyl, propyl or similar groups, and in which the R and R' groups taken together contain not less than two carbon atoms, nor more than six, and in which the carbonyl groups are adjacent to each other.

3. As a new article of manufacture, oleomargarine having included therein a relatively small proportion of a mixture of the diketone diacetyl, and another diketone having the general structure

wherein "R" and "R'" represent ethyl, methyl, propyl or similar groups, and in which the R and R' groups taken together contain not less than two carbon atoms, nor more than six, and in which the carbonyl groups are adjacent to each other.

4. As a new article of manufacture, oleomargarine having included therein a relatively small proportion of the diketone diacetyl, and another diketone having the general structure

wherein "R" and "R'" represent ethyl, methyl, or propyl groups, and in which the two groups R and R' taken together contain not less than four carbons nor more than six, and in which the carbonyl groups are adjacent to each other.

5. As a new article of manufacture, oleomargarine having included therein a relatively small proportion of a relatively small amount of a mixture of three parts of diacetyl, and approximately one-fourth part of 2.3 pentadione.

6. The method of improving the flavor of margarine which consists in first producing the margarine and then kneading into the completed margarine, a solution of a diketone having the general structure

wherein "R" and "R'" represent ethyl, methyl, propyl or similar groups, and in which the R and R' groups taken together contain not less than two carbon atoms, nor more than six, and in which the carbonyl groups are adjacent to each other.

7. The method of producing margarine having an improved flavor which comprises forming an emulsion of oleaginous and aqueous materials and adding thereto a relatively small amount of a diketone substantially having the general structure

wherein R and R' represent ethyl, methyl, propyl or similar groups, and in which the R and R' groups taken together contain not less than two carbon atoms, nor more than six, and in which the carbonyl groups are adjacent to each other.

8. The method of producing margarine having an improved flavor which comprises forming an emulsion of oleaginous and aqueous materials and incorporating in such emulsion a relatively small amount of a diketone having the general structure

wherein "R" and "R'" represent ethyl, methyl, propyl or similar groups, and in which the R and R' groups taken together contain not less than two carbon atoms, nor more than six, and in which the carbonyl groups are adjacent to each other.

9. The method of producing margarine having an improved flavor which comprises forming an emulsion of oleaginous and aqueous materials and incorporating in such emulsion a relatively small amount of a mixture of diketones, each having the general structure

wherein "R" and "R'" represent ethyl, methyl, propyl or similar groups, and in which R and R' groups taken together contain not less than two carbon atoms, nor more than six, and in which the carbonyl groups are adjacent to each other.

10. The method of improving the flavor of margarine which comprises the step of adding thereto a relatively small amount of diacetyl.

11. The method of improving the flavor of margarine which comprises the step of adding thereto a relatively small amount of 2.3 pentadione.

ALBERT K. EPSTEIN.
BENJAMIN R. HARRIS.